(12) United States Patent
Photos et al.

(10) Patent No.: US 11,174,180 B1
(45) Date of Patent: Nov. 16, 2021

(54) REMOVING SULPHUR-BASED CONTAMINANTS AND NITROGEN-BASED CONTAMINANTS FROM WATER STREAMS

(71) Applicants: Peter J Photos, El Campo, TX (US); Franklin Hailey Brown, II, San Antonio, TX (US); John C Bourdon, Peculiar, MO (US); Billy G Clark, Dallas, TX (US); David Sisk, San Antonio, TX (US)

(72) Inventors: Peter J Photos, El Campo, TX (US); Franklin Hailey Brown, II, San Antonio, TX (US); John C Bourdon, Peculiar, MO (US); Billy G Clark, Dallas, TX (US); David Sisk, San Antonio, TX (US)

(73) Assignee: Streamline Innovations, Inc., San Antonio, TX (US)

( * ) Notice: Subject to any disclaimer, the term of this patent is extended or adjusted under 35 U.S.C. 154(b) by 150 days.

(21) Appl. No.: 16/388,594

(22) Filed: Apr. 18, 2019

Related U.S. Application Data

(60) Provisional application No. 62/659,753, filed on Apr. 19, 2018.

(51) Int. Cl.
| | | |
|---|---|---|
| *C02F 1/72* | (2006.01) | |
| *C02F 1/30* | (2006.01) | |
| C02F 103/10 | (2006.01) | |
| C02F 101/16 | (2006.01) | |
| C02F 101/10 | (2006.01) | |

(52) U.S. Cl.
CPC .............. *C02F 1/72* (2013.01); *C02F 1/302* (2013.01); *C02F 2101/101* (2013.01); *C02F 2101/16* (2013.01); *C02F 2103/10* (2013.01)

(58) Field of Classification Search
CPC ........................................................ C02F 1/72
See application file for complete search history.

(56) References Cited

U.S. PATENT DOCUMENTS

| | | | |
|---|---|---|---|
| 4,649,032 A | 3/1987 | Snavely, Jr. | |
| 4,775,793 A | 10/1988 | Paul | |
| 5,472,633 A | 12/1995 | Griffin, Jr. | |
| 6,165,436 A | 12/2000 | Dezael | |
| 6,221,652 B1 | 4/2001 | Janssen | |
| 6,960,330 B1 | 11/2005 | Cox, Jr. | |
| 6,998,099 B2 | 2/2006 | Hesse | |
| 7,662,294 B1 | 2/2010 | Cox, Jr. | |
| 7,745,680 B1 | 6/2010 | Cox, Jr. | |
| 7,846,408 B1 | 12/2010 | Cox, Jr. | |
| 7,928,277 B1 | 4/2011 | Cox, Jr. | |
| 7,968,761 B1 | 6/2011 | Cox, Jr. | |
| 8,480,924 B1 | 6/2013 | Cox, Jr. | |

(Continued)

*Primary Examiner* — Peter Keyworth
(74) *Attorney, Agent, or Firm* — Anderson Gorecki LLP

(57) ABSTRACT

A small-scale system for removing hydrogen sulfide and ammonia from a wastewater stream includes a sulfur recovery stage, an ammonia recovery stage, and a separation stage. Sulfur species are oxidized and converted into solid sulfur and solid sulfur species by exposure to a combination of chelated iron and oxidizer. The solid sulfur and solid sulfur species are removed by filtration to yield a sulfur-free stream to which oxidizer is added and electromagnetic radiation is inputted to break the N—H bonds of the ammonia into amine radicals. The combination of additional oxidizer and electromagnetic radiation promotes the creation of water and nitrogen gas.

15 Claims, 2 Drawing Sheets

(56) References Cited

U.S. PATENT DOCUMENTS

| | | |
|---|---|---|
| 8,609,926 B1 | 12/2013 | Cox, Jr. |
| 8,858,806 B1 | 10/2014 | Cox, Jr. |
| 8,937,210 B1 | 1/2015 | Cox, Jr. |
| 9,067,812 B1 | 6/2015 | Cox, Jr. |

REMOVING SULPHUR-BASED CONTAMINANTS AND NITROGEN-BASED CONTAMINANTS FROM WATER STREAMS

TECHNICAL FIELD

Aspects of the present disclosure are generally related to treatment of wastewater, and more particularly to small-scale systems for removing sulfur-based contaminants and hydrogen-based contaminants from wastewater streams.

BACKGROUND

Raw natural gas and crude oil from production wells must be processed and refined to create the finished natural gas and petroleum products used by consumers. Some contaminants in the product stream generated by the well present a serious health hazard. Hydrogen sulfide ($H_2S$), for example, is a highly toxic contaminant. Sulfides ($S^{2-}$) and sulfites ($SO_3^{2-}$) can cause environmental damage if combusted in refined products such as gasoline and diesel fuel. Other contaminants such as ammonia ($NH_3$) and similar amines reduce the efficiency of crude oil refinement processes. Ammonia gas is also an environmental hazard and cannot be safely vented into the atmosphere. Consequently, it is desirable to remove certain contaminants from the product stream before refinement, and as close to the wellhead as practical.

It is known to separate hydrogen sulfide and ammonia from raw crude oil and raw natural gas product streams. The separation process, while effective in diverting contaminants away from the product stream, creates a sour water stream that contains hydrogen sulfide and ammonia. The sour water stream may be processed by burning-off the hydrogen sulfide and ammonia in a furnace. Alternatively, a Claus process may be used to treat the hydrogen sulfide. The Claus process, which has been known since the 19$^{th}$ century, is a catalytic chemical process for converting gaseous hydrogen sulfide into elemental sulfur (S). Claus plants and furnaces are only economical and practical when implemented on a large scale.

SUMMARY

Aspects of the present disclosure include combining a chelant-based, oxidation-reduction sulfur removal process with an electromagnetic radiation-based ammonia removal process. The processes may be synergistically combined by employing overlapping chemical reagents and/or mechanical processes. As a result, greater efficiency may be achieved in comparison with independently implemented processes. Furthermore, implementation at a meso- or small-scale may be practical, which is an advantage over existing wastewater treatment systems that are only practical when implemented at a large scale.

In accordance with an aspect a method comprises: converting sulfur species that are present in a wastewater stream into at least one of solid sulfur and solid sulfur species, comprising the steps of: introducing chelated iron to the wastewater stream; and introducing an oxidizer to the wastewater stream; removing at least one of solid sulfur and solid sulfur species from the wastewater stream, thereby creating a sulfur-free stream; emitting electromagnetic radiation into the sulfur-free stream; and introducing additional oxidizer to the sulfur-free stream. Some implementations comprise the further step of separating the sulfur-free stream into phases. Some implementations comprise removing nitrogen gas in a separated gaseous phase. Some implementations comprise removing iron precipitate in a separated solid phase. Some implementations comprise removing elemental sulfur in a separated solid phase. Some implementations comprise removing sweet water in a separated aqueous phase. In some implementations emitting electromagnetic radiation into the sulfur-free stream comprises emitting microwave radiation into the sulfur-free stream. In some implementations emitting electromagnetic radiation into the sulfur-free stream comprises emitting ultraviolet radiation into the sulfur-free stream. In some implementations introducing chelated iron to the wastewater stream comprises introducing one or more of ferric salts, ferrous salts, ferric chelants, and ferrous chelants. In some implementations introducing chelated iron to the wastewater stream comprises introducing Alanine, n,n-bid, (carboxymethyl) iron complex.

In accordance with an aspect an apparatus comprises: a hydrogen sulfide abatement container into which a wastewater stream, chelated iron, and oxidizer are introduced, oxidation of the hydrogen sulfide resulting in generation of at least one of solid sulfur and solid sulfur species; filtration that removes the at least one of solid sulfur and solid sulfur species from the wastewater stream, thereby creating a sulfur-free stream; and an ammonia abatement container connected to receive the sulfur-free stream and additional oxidizer, the ammonia abatement container comprising a source of electromagnetic radiation that emits electromagnetic radiation into the sulfur-free stream. Some implementations comprise a separation unit connected to receive an output stream from the ammonia abatement container, the output stream being separated into phases in the separation unit. Some implementations comprise a filter connected to receive an output from the hydrogen sulfide abatement container and provide an aqueous phase output and a solid phase output. Some implementations comprise one or more of ferric salts, ferrous salts, ferric chelants, and ferrous chelants that are introduced to the wastewater stream in the hydrogen sulfide abatement container. Some implementations comprise Alanine, n,n-bid, (carboxymethyl) iron complex that is introduced to the wastewater stream in the hydrogen sulfide abatement container.

In accordance with an aspect a method for separating sweet water from a wastewater stream comprises: converting sulfur species that are present in a wastewater stream into at least one of solid sulfur and solid sulfur species via oxidation, comprising the steps of: introducing chelated iron to the wastewater stream; and introducing an oxidizer to the wastewater stream; removing the at least one of solid sulfur and solid sulfur species from the wastewater stream, thereby creating a sulfur-free stream; emitting electromagnetic radiation into the sulfur-free stream; introducing additional oxidizer to the sulfur-free stream; separating the sulfur-free stream into phases; and separating the sweet water as an aqueous phase. In some implementations emitting electromagnetic radiation comprises emitting microwave radiation. In some implementations emitting electromagnetic radiation comprises emitting ultraviolet radiation. In some implementations introducing chelated iron to the wastewater stream comprises introducing one or more of ferric salts, ferrous salts, ferric chelants, and ferrous chelants. In some implementations introducing chelated iron to the wastewater stream comprises introducing Alanine, n,n-bid, (carboxymethyl) iron complex.

All examples, aspects, and features mentioned in this document can be combined in any technically possible way.

DETAILED DESCRIPTION

Figure 1:
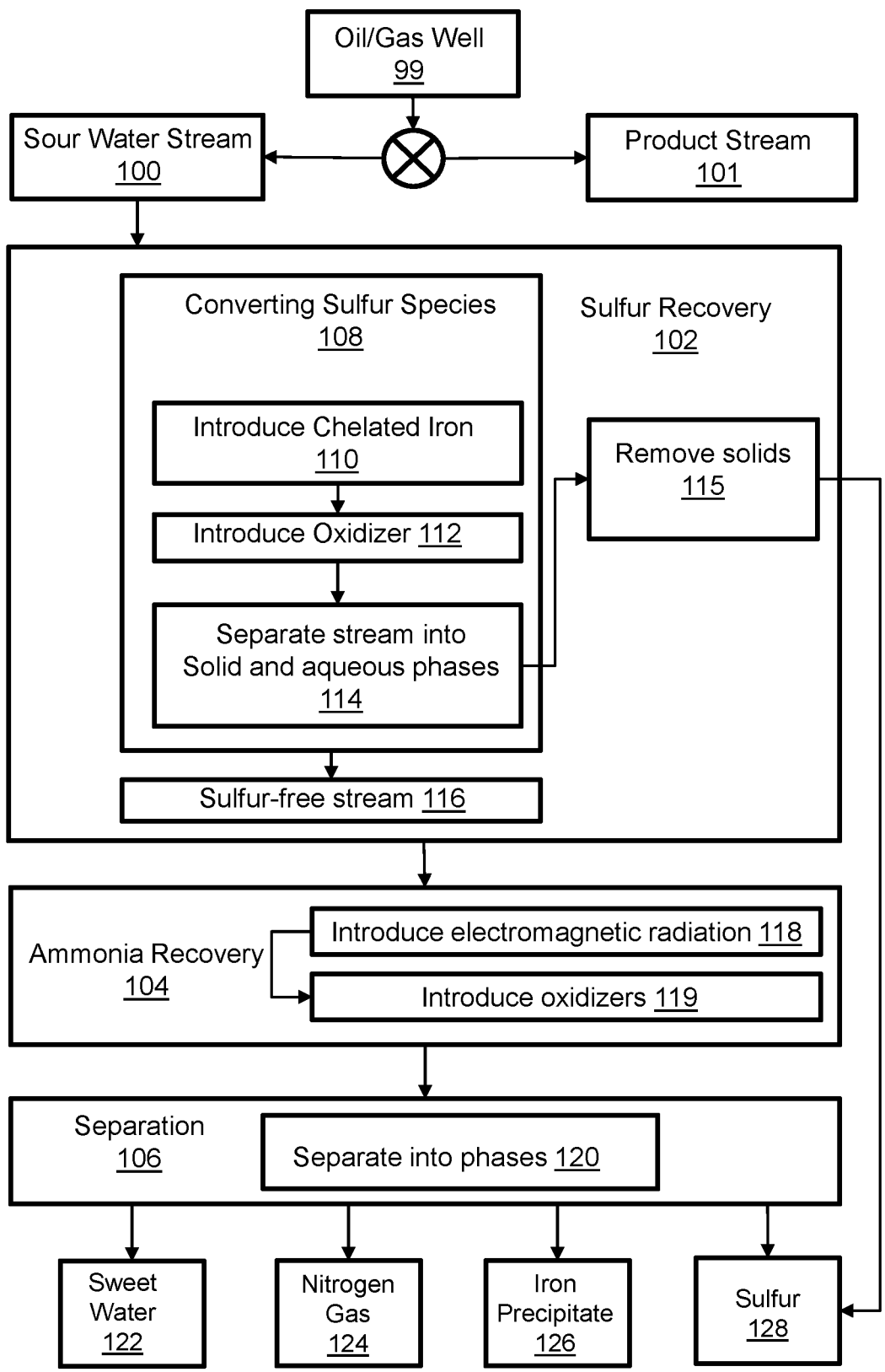
FIG. 1 illustrates a process for removal of contaminants from wastewater streams associated with oil and gas wells.

FIG. 1 illustrates a process for removing contaminants such as hydrogen sulfide and ammonia from a sour water stream 100 that has been separated from a product stream 101 from a raw natural gas or crude oil well 99. Although the process is described and illustrated in the context of oil and gas production, wastewater that contains sulfur-based and hydrogen-based contaminants from a wide variety of sources other than sour water from oil and gas wells could be treated. For example, and without limitation, the process might be used to treat leachate from landfills and discharge wastewater from meat production facilities. Consequently, the invention should not be viewed as limited to treatment of sour water from oil and gas production. The process for removing the contaminants from a wastewater stream includes three stages: sulfur recovery 102; ammonia recovery 104; and separation 106. The order in which steps are performed at each stage may be rearranged, and some steps may be implemented partially or wholly concurrently.

The sulfur recovery stage 102 includes various steps for treating hydrogen sulfide by separating and recovering sulfur from the sour water stream 100. Step 108 is converting sulfur species that are present in the sour water stream into solid sulfur, which may include elemental sulfur, sulfur species, or both. The converted stream is separated into solid and aqueous phases and the separated converted solids are removed in step 115, such as by filtering, which results in recovery of solid sulfur 128 in the form of elemental sulfur, sulfur species, or both from the sour water stream. The remaining aqueous phase is a sulfur-free stream 116, where "sulfur-free" means that the aqueous phase of the stream has a sufficiently low concentration of sulfur that the ammonia removal stage 104 is not inhibited. For context, and without limitation, the sulfur-free stream 116 may contain 30 parts per million or less of sulfur, by weight, in the aqueous phase.

To convert the sulfur species in step 109, a chelated iron reagent is introduced to the sour water stream in step 110. The pH of the sour water stream is strongly influenced by the presence of ammonia, a strong base, and the reagent should be effective at the pH of the sour water stream. Reagents may include one or more of ferric salts, ferrous salts, ferric chelants, ferrous chelants, and Fe-MGDA (ferric/ferrous methylglycinediacetate), e.g. Alanine, n,n-bid, (carboxymethyl) iron complex (CAS 547763-83-7). Step 112 includes addition of one or more oxidizers to the sour water stream. A wide variety of oxidizers may be used, including but not limited to one or more of chlorine, hypochlorous acid, hypochlorite, chlorine dioxide, chlorite, perchlorate, inorganic peroxides, permanganates, sodium, oxygen, and ozone. In some implementations, oxygen and/or peroxides are used as the oxidizer and the oxygen is provided by ambient air. The hydrogen sulfide in the sour water stream is oxidized into elemental sulfur, sulfur species, or both by exposure to the combination of chelated iron and oxidizer. The stream is then separated into a solid phase and an aqueous phase in step 114 and the solids are removed in step 115 as described above.

The ammonia recovery stage 104 may include various steps for separating and recovering ammonia from the sulfur-free stream 116. Step 118 is introducing electromagnetic radiation. The electromagnetic radiation may be introduced in the form of UV (Ultraviolet) light, microwave radiation, or both. The electromagnetic radiation breaks the N—H bonds of the ammonia in the sulfur-free stream into amine radicals. Step 119 is introducing one or more oxidizers. A wide variety of oxidizers may be used, including but not limited to one or more of chlorine, hypochlorous acid, hypochlorite, chlorine dioxide, chlorite, perchlorate, inorganic peroxides, permanganates, sodium, oxygen, and ozone. The oxidizer or oxidizers may be, but are not necessarily, from the same source as the oxidizers described in step 114, i.e. more of the same oxidizer or oxidizers may be added. In some implementations, hypochlorite is used in the presence of a catalyst and the electromagnetic radiation to oxidize the ammonia to amines and then to nitrogen gas. Thus, the combination of oxidizers and electromagnetic radiation promote the creation of water and nitrogen gas.

In the separation stage 106 the output stream from the ammonia recovery stage is separated into phases as indicated in step 120. More specifically, the stream is separated into one or more of the following distinct phases: aqueous phase, oil phase, gaseous phase, and solid phase. The aqueous phase is sweet water 122 that is sulfur-free and ammonia-free in accordance with government regulatory standards. The gaseous phase includes nitrogen gas 124 in the form of gaseous nitrogen and nitrogen species that are easily removed by processes further downstream. The other phases may include iron precipitate 126 and sulfur 128 in the form of elemental sulfur, sulfur species, or both.

Figure 2:
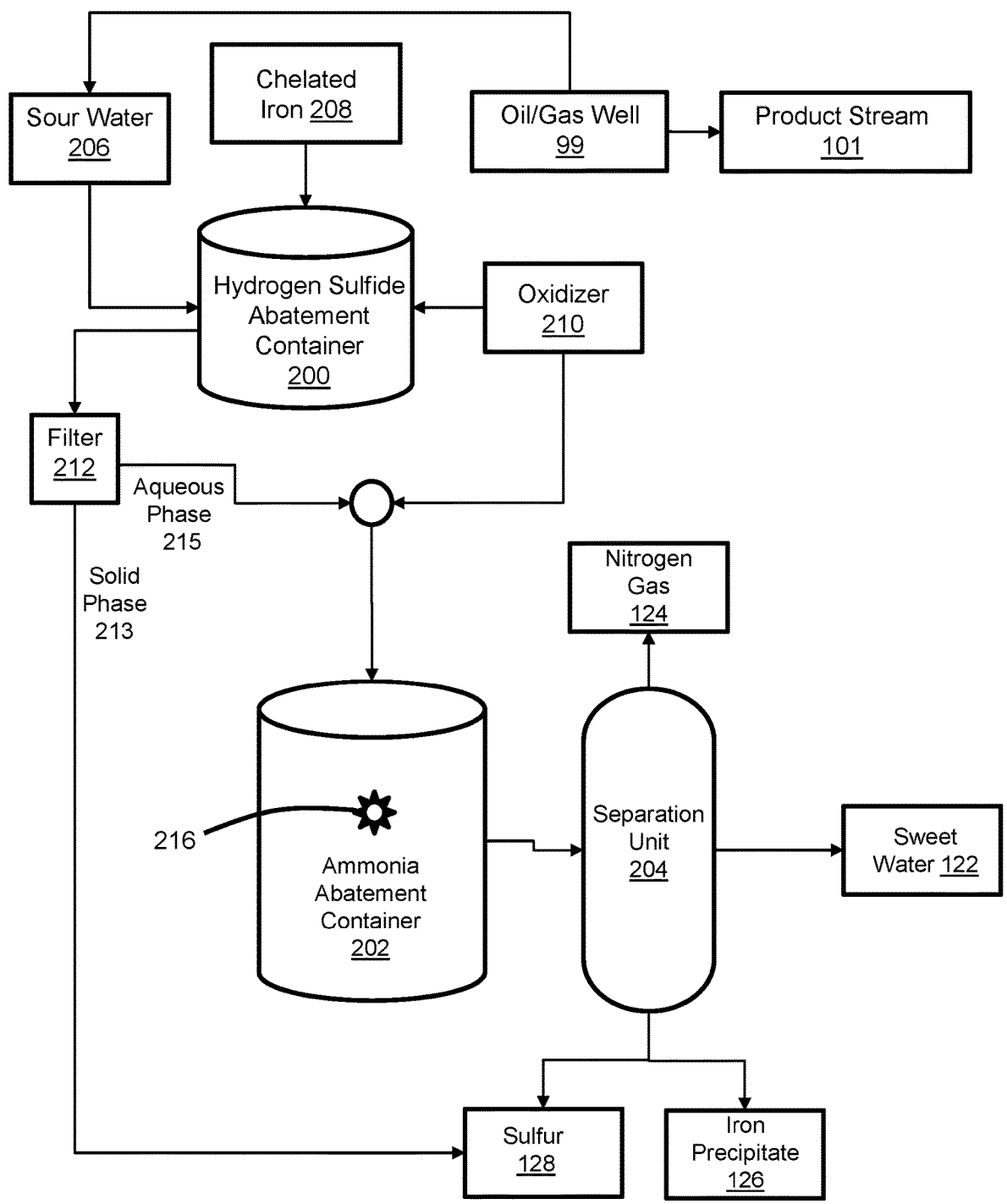
FIG. 2 illustrates an apparatus for removal of contaminants from wastewater streams associated with oil and gas wells.

FIG. 2 illustrates an apparatus for removal of contaminants from sour water streams associated with oil and gas wells. The apparatus includes a hydrogen sulfide abatement container 200, an ammonia abatement container 202, and a separation unit 204. Sour water 206, chelated iron 208, and oxidizer 210 are introduced to the hydrogen abatement container 200. The hydrogen sulfide in the sour water stream is oxidized into elemental sulfur, sulfur species, or both by exposure to the chelated iron and oxidizer. An agitator may be used to facilitate exposure of the sour water to the chelated iron and oxidizer. A filter 212 may be used to separate the solid phase 213 from the aqueous phase 215. The separated solid phase includes the sulfur 128 (elemental and/or sulfur species). The remaining aqueous phase 215 is a sulfur-free stream.

Additional oxidizer 210 is introduced to the sulfur-free stream 116, and the resulting stream is introduced to the ammonia abatement container 202. The ammonia abatement container includes at least one electromagnetic radiation source 216. The electromagnetic radiation source, which may generate UV and/or microwave radiation, may include one or more of a sodium vapor lamp, a mercury vapor lamp, a metal arc lamp, a vacuum tube, a solid state UV source, a light-emitting diode, a metal halide lamp, and a solid state microwave source. The electromagnetic radiation breaks the N—H bonds of the ammonia into amine radicals while the oxidizer promotes the creation of water and nitrogen gas.

The resulting stream is provided to a separation unit 204, which separates the stream into one or more of an aqueous phase, oil phase, gaseous phase, and solid phase. The aqueous phase is sweet water 122 that is sulfur-free and ammonia-free in accordance with government regulatory standards. The gaseous phase may include nitrogen gas 124 (including gaseous nitrogen species and/or nitrogen species that are easily removed by processes further downstream). The other phases may include iron precipitate 126 and elemental sulfur 128.

Several features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
converting sulfur species that are present in a wastewater stream into at least one of solid sulfur and solid sulfur species, comprising the steps of:
introducing chelated iron to the wastewater stream; and
introducing an oxidizer to the wastewater stream;
removing at least one of solid sulfur and solid sulfur species from the wastewater stream, thereby creating a sulfur-free stream;
emitting electromagnetic radiation into the sulfur-free stream; and
introducing additional oxidizer to the sulfur-free stream.

2. The method of claim 1 comprising the further step of separating the sulfur-free stream into phases.

3. The method of claim 2 comprising removing nitrogen gas in a separated gaseous phase.

4. The method of claim 3 comprising removing iron precipitate in a separated solid phase.

5. The method of claim 3 comprising removing elemental sulfur in a separated solid phase.

6. The method of claim 5 comprising removing sweet water in a separated aqueous phase.

7. The method of claim 1 wherein emitting electromagnetic radiation into the sulfur-free stream comprises emitting microwave radiation into the sulfur-free stream.

8. The method of claim 1 wherein emitting electromagnetic radiation into the sulfur-free stream comprises emitting ultraviolet radiation into the sulfur-free stream.

9. The method of claim 1 wherein introducing chelated iron to the wastewater stream comprises introducing one or more of ferric salts, ferrous salts, ferric chelants, and ferrous chelants.

10. The method of claim 1 wherein introducing chelated iron to the wastewater stream comprises introducing Alanine, n,n-bid, (carboxymethyl) iron complex.

11. A method comprising:
converting sulfur species that are present in a wastewater stream into at least one of solid sulfur and solid sulfur species via oxidation, comprising the steps of:
introducing chelated iron to the wastewater stream; and
introducing an oxidizer to the wastewater stream;
removing the at least one of solid sulfur and solid sulfur species from the wastewater stream, thereby creating a sulfur-free stream;
emitting electromagnetic radiation into the sulfur-free stream;
introducing additional oxidizer to the sulfur-free stream;
separating the sulfur-free stream into phases; and
separating the sweet water as an aqueous phase.

12. The method of claim 11 wherein emitting electromagnetic radiation comprises emitting microwave radiation.

13. The method of claim 11 wherein emitting electromagnetic radiation comprises emitting ultraviolet radiation.

14. The method of claim 11 wherein introducing chelated iron to the wastewater stream comprises introducing one or more of ferric salts, ferrous salts, ferric chelants, and ferrous chelants.

15. The method of claim 11 wherein introducing chelated iron to the wastewater stream comprises introducing Alanine, n,n-bid, (carboxymethyl) iron complex.

* * * * *